United States Patent
Cheal et al.

(10) Patent No.: US 8,186,710 B2
(45) Date of Patent: May 29, 2012

(54) VEHICLE CURTAIN AIRBAG

(75) Inventors: Blake L. Cheal, Perry, UT (US); Joshua Clayton Allred, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/232,179

(22) Filed: Sep. 14, 2011

(65) Prior Publication Data
US 2012/0001407 A1    Jan. 5, 2012

Related U.S. Application Data

(62) Division of application No. 12/573,442, filed on Oct. 5, 2009, now Pat. No. 8,020,888.

(51) Int. Cl.
*B60R 21/213*  (2011.01)
*B60R 21/233*  (2006.01)

(52) U.S. Cl. ................. 280/730.2; 280/729

(58) Field of Classification Search .......... 280/730.2, 280/729
See application file for complete search history.

(56) References Cited

U.S. PATENT DOCUMENTS

| | | | |
|---|---|---|---|
| 6,830,262 B2 | 12/2004 | Sonnenberg et al. | |
| 7,500,694 B2* | 3/2009 | Heudorfer et al. | 280/729 |
| 2006/0061071 A1 | 3/2006 | Noguchi et al. | |
| 2007/0001433 A1* | 1/2007 | Gu et al. | 280/729 |
| 2008/0191453 A1 | 8/2008 | Mansson et al. | |
| 2010/0025971 A1* | 2/2010 | Steinbach et al. | 280/729 |

FOREIGN PATENT DOCUMENTS
JP    2008-1197    1/2008
* cited by examiner

*Primary Examiner* — Drew Brown
(74) *Attorney, Agent, or Firm* — Sally J. Brown; Madson IP

(57) ABSTRACT

A post-deployment, position-stabilized curtain airbag has a top edge from which an inflatable safety cushion is supported by a vehicle for deployment into a vehicle passenger compartment between occupant and occupant enclosure. A fill chamber is secured to the top edge of the safety cushion. An inflatable structural member is mechanically connected to the safety cushion. The fill chamber directs pressurized gas into the safety cushion and the structural member. The structural member deploys into the passenger compartment between the safety cushion and occupant enclosure limiting outboard displacement of the safety cushion. The structural member fully deploys after the safety cushion. Another structural member deploys along the top edge of the safety cushion limiting pivoting of the safety cushion there relative to the fill chamber. Pressurized gas enters each structural member through auxiliary passageways having oppositely directed entrances and outlets.

8 Claims, 4 Drawing Sheets

VEHICLE CURTAIN AIRBAG

This application is a divisional of U.S. patent application Ser. No. 12/573,442, filed Oct. 5, 2009, which is incorporated herein by this reference.

BACKGROUND OF THE INVENTION

1. Field of the Invention

The present invention relates to vehicle passenger safety modules that use pressurized gas from an inflator to deploy an airbag between passengers and the occupant enclosure interior of a vehicle in the event of a collision or rollover. More particularly, the present invention pertains to curtain airbags that inflate at the sides of the passenger compartment between an occupant and the occupant enclosure of the vehicle.

2. Background

A typical airbag for a vehicle passenger safety module captures pressurized gas from an associated inflator, thereby becoming a gas-filled cushion interposed between a vehicle occupant and the interior vehicle surfaces of the occupant enclosure that surround that occupant. Typically, the inflator is ignited electrically in response to a momentum monitor carried in the vehicle.

The driver/passenger safety cushion of a curtain airbag deploys downwardly from the ceiling trim at the side of the passenger compartment by filling with pressurizes gas from an associated inflator, typically assuming the form of a thin, elongated generally planar barrier between occupants and the side windows of the vehicle.

A deployed curtain airbag safety cushion is accordingly stably secured at the top thereof to the occupant enclosure. The bottom of the safety cushion is by contrast relatively less restrained. Consequently, the safety cushion below the top thereof may engage in undesirable outboard motion that can expose an occupant to injury.

BRIEF SUMMARY OF THE INVENTION

According to teachings of the present invention, a post-deployment position-stabilized curtain airbag for installation in a vehicle to protect an occupant in case of side impact or rollover includes an inflatable passenger safety cushion supportable at a top edge thereof interior of the vehicle for deployment into the passenger compartment of the vehicle between the occupant and the occupant enclosure, a fill chamber secured to the top edge of the safety cushion in fluid communication therewith, and an inflatable structural member mechanically connected to the safety cushion. The fill chamber directs pressurized gas from an inflator into the safety cushion to effect the deployment thereof. The structural member is disposable upon installation in the vehicle for deployment into the passenger compartment between the deployed safety cushion and the occupant enclosure using pressurized gas directed through the fill chamber. The deployed structural member serves to limit outboard displacement of the deployed safety cushion.

The full deployment of the structural member occurs subsequently to the full deployment of the safety cushion. The safety cushion has a rear portion deploying toward the rear of the passenger compartment and a forward portion remote therefrom, and pressurized gas enters the structural member through an auxiliary passageway communicating with the rear portion of the safety cushion. Upon installation of the airbag in the vehicle, the entrance to the auxiliary passageway from the rear portion of the safety cushion is oppositely directed from the outlet of the auxiliary passageway into the structural member. The structural member deploys along the top edge of the safety cushion, and the deployed structural member serves to limit pivoting of the deployed safety cushion at the top edge thereof relative to the fill chamber.

According to another more specific aspect of the present invention, a curtain airbag includes an inflatable passenger safety cushion as described above having a rear portion deploying toward the rear of the passenger compartment and a forward portion remote therefrom, a fill chamber secured to the top edge of the safety cushion in fluid communication therewith that directs pressurized gas from an inflator into the safety cushion to effect deployment thereof, and an inflatable structural member mechanically connected to the rear portion of the safety cushion. The structural member is disposable upon installation in the vehicle for deployment into the passenger compartment between the deployed safety cushion and the occupant enclosure using pressurized gas directed from the fill chamber through the safety cushion. The deployed structural member serves to limit outboard displacement of the rear portion of the deployed safety cushion. An auxiliary passageway communicates between structural member and the lower edge, the rear edge, or the top edge of the rear portion of the safety cushion. Pressurized gas from the safety cushion enters the structural member through the auxiliary passageway. Upon installation of the airbag in the vehicle, the entrance to the auxiliary passageway from the rear portion of the safety cushion is oppositely directed from the outlet of the auxiliary passageway into the structural member.

The safety cushion and the structural member are formed between coextensive flexible inboard and outboard panels. Upon installation of the airbag in the vehicle, the structural member is folded back upon the safety cushion, and the fold between structural member and the safety cushion traverses an auxiliary passageway communicating between the safety cushion and the structural member.

The full deployment of the structural member is completed after the completion of the full deployment of the safety cushion. For example, if the safety cushion fully deploys within about 50 milliseconds of side impact or rollover, the structural member fully deploys within about 150 milliseconds of side impact or rollover.

According to yet another specific aspect of the present invention, a curtain airbag includes an inflatable passenger safety cushion and a fill chamber as described above in combination with an inflatable structural member mechanically connected to the safety cushion, the structural member and disposable upon installation in the vehicle for deployment into the passenger compartment along the top edge of the safety cushion between the deployed safety cushion and the occupant enclosure. The structural member is mechanically connected to the safety cushion by the fill chamber. Pressurized gas directed through the fill chamber directly into the structural member inflates the structural member, which then serves to limit pivoting of the deployed safety cushion at the top edge thereof relative to the fill chamber. The length of the structural member may be made less than the length of the safety cushion. In such instances, the structural member deploys along a portion of the top edge of the safety cushion corresponding to the seated position of the occupant in the passenger compartment.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1-7, is not intended to limit the scope of the invention, as claimed, but is merely representative of presently preferred embodiments of the invention.

Figure 1:
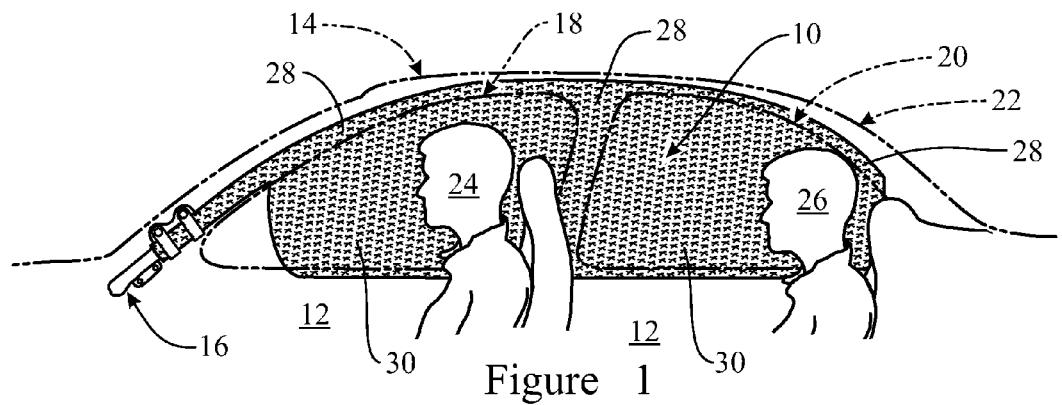
FIG. 1 is an elevation view, of a first embodiment of an inflated curtain airbag embodying teachings of the present invention superimposed against profiles in phantom of the side windows and the exterior of a typical passenger vehicle.

FIG. 1 is an elevation view of a first embodiment of a curtain airbag 10 embodying teachings of the present invention. Airbag 10 has been deployed downwardly into a passenger compartment 12 of a vehicle 14 under the influence of pressurized gas entered into an open end 15 (see FIG. 2) of airbag 10 from an associated inflator 16. Inflator 16 and airbag 10 are superimposed by way of perspective against profiles in phantom of a front side window 18, a rear side window 20, and the exterior 22 of vehicle 14.

In the foreground of airbag 10 are a front seat occupant 24 and a back seat occupant 26. Airbag 10 has inflated into a thin, planar barrier sufficiently elongated to be interposed both between occupant 24 and front side window 18, and between occupant 26 and rear side window 20. Occupants 24 and 26 are to be protected by airbag 10 in the case of a side impact or a rollover involving vehicle 14. Alternatively, a distinct but foreshortened curtain airbag, such as airbag 10, may be disposed next to each of occupants 24 and 26 individually.

In the deployed condition, airbag 10 is stably secured at the top 28 thereof to the occupant enclosure that surrounds vehicle compartment 12. The bottom 30 of airbag 10 is by contrast relatively less restrained, particularly in a lateral outboard-inboard direction. According to teachings of the present invention, the lateral positional stability of airbag 10 after deployment is enhanced through the incorporation into airbag 10 of a supplemental structural member that inflates with airbag 10. By improving post-deployment lateral stability in airbag 10, the inflated structural member reduces the risk of injury to occupants 24 and 26 because of outboard motion of airbag 10 below top 28.

Figure 2:
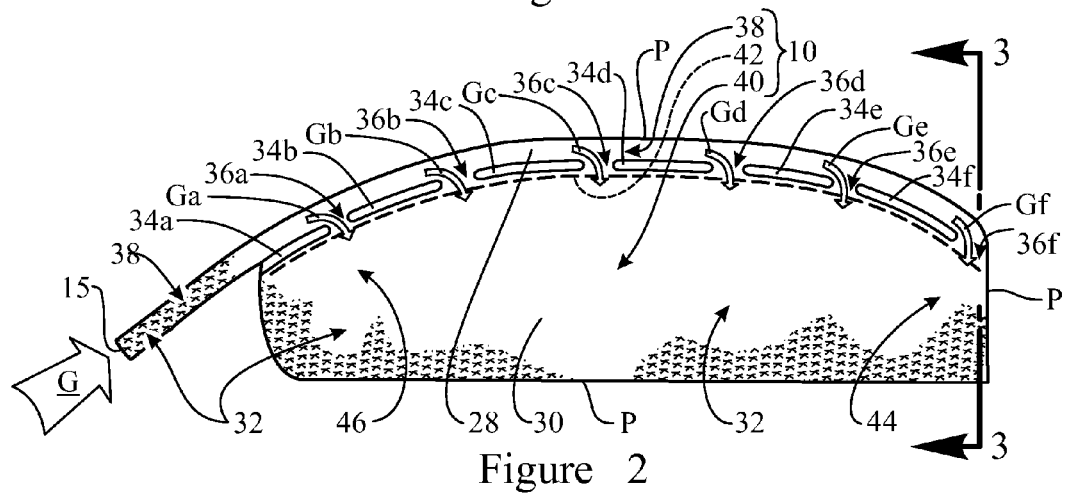
FIG. 2 is an elevation view of the curtain airbag of FIG. 1 exclusively, illustrating functional divisions of the curtain airbag.

FIG. 2 is a slightly enlarged elevation view of airbag 10 exclusively. Airbag 10 is fabricated from a pair of coextensive, congruent, flexible, gas-impermeable fabric panels. These include an inboard panel 32 visible in FIG. 2, which comes to be disposed facing occupants 24 and 26 when airbag 10 is deployed, and an outboard panel that is obscured in FIG. 2 by inboard panel 32. The outboard panel of airbag 10 will, therefore, be introduced in relation to a subsequent figure. The panels of airbag 10 are disposed in alignment atop one another and secured with adhesive and/or stitching at a continuous exterior attachment zone at the common periphery P of both. Enclosed thereby between the panels is an interior space in which airbag 10 captures pressurized gas and inflates. Such pressurized gas G is shown diagrammatically in FIG. 2 as an arrow in the process of being delivered into airbag 10 through open end 15 thereof. Open end 15 of airbag 10 is the sole portion of common periphery P of the panels of airbag 10 that, being free of any exterior attachment zone, are not secured to each other.

The fabric panels of airbag 10 are also secured to each other at selected interior attachment zones within periphery P. The interior attachment zones of airbag 10 direct the flow of pressurized gas G throughout airbag 10 appropriately and determine the shape into which airbag 10 will ultimately inflate. Of the various interior attachment zones of airbag 10, only elongated plenum boundaries 34a-34f are shown in FIG. 2.

Plenum boundaries 34a-34f are positioned in an end-to-end alignment that mirrors the shape of top 28 of airbag 10. At the end of each of plenum boundaries 34a-34f remote from open end 15 of airbag 10 is a corresponding gas flow gap 36a-36f. Thus, for example, gas flow gap 36a is located between plenum boundaries 34a and 34b, while gas flow gap 36f, the furthest gas flow gap from open end 15 of airbag 10, is between plenum boundary 34f and periphery P of the panels of airbag 10. Pressurized gas G entering airbag 10 is initially directed away from open end 15, between plenum boundaries 34a-34f and top 28 of airbag 10. Fractional portions Ga-Gf of pressurized gas G bleed through each of gas flow gaps 36a-36f, respectively, entering and inflating the portion of airbag 10 between plenum boundaries 34a-34f and bottom 30 of airbag 10. Thus, portion Ga of pressurized gas G enters the portion of airbag 10 between plenum boundaries 34a-34f and bottom 30 by way of gas flow gap 36a, while portion Gf enters through gas flow gap 36f.

By way of functional overview, airbag 10 is thus divided by plenum boundaries 34a-34f into an elongated, tubular fill chamber 38 that is located between plenum boundaries 34a-34f and top 28 of airbag 10, and an inflatable passenger safety cushion 40 that is located between plenum boundaries 34a-34f and bottom 30 of airbag 10. Safety cushion 40 has a top edge 42 identified in FIG. 2 by a dashed line just below plenum boundaries 34a-34f. Tubular fill chamber 38 is secured to top edge 42 of safety cushion 40 and accordingly supports safety cushion 40 interior of vehicle 14 for deployment into passenger compartment 12 in the manner illustrated in FIG. 1. Tubular fill chamber 38 communicates pneumatically with safety cushion 40 at top edge 42 thereof by way of gas flow gaps 36a-36f. Thus, fill chamber 38 directs pressurized gas G into safety cushion 40 in portions Ga-Gf, which vary in quantity relative to each other according to the specific configuration of each of gas flow gaps 36a-36f individually.

Safety cushion 40 has a rear portion 44 that deploys toward the rear of passenger compartment 12 and a forward portion 46 remote therefrom that correspondingly deploys toward the front of passenger compartment 12.

Figure 3:
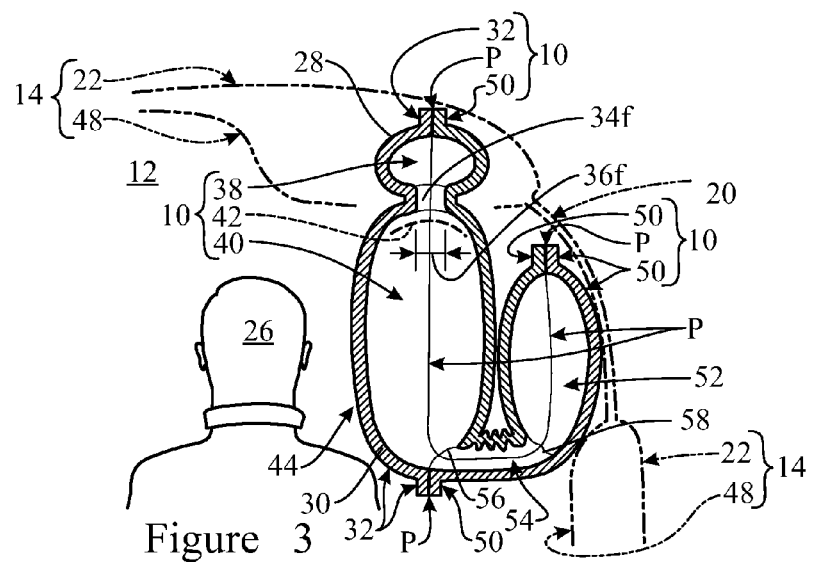
FIG. 3 is a cross section of the airbag of FIG. 2 taken along section line 3-3 therein superimposed against a profile in phantom of the occupant enclosure and the exterior of the passenger vehicle of FIG. 1.

FIG. 3 is a cross section of rear portion 44 of airbag 10 taken along section line 3-3 in FIG. 2. By way of perspective, that view of airbag 10 is superimposed against profiles in phantom of exterior 22 of vehicle 14 of FIG. 1 and of the occupant enclosure 48 for passenger compartment 12. A rear view of back seat occupant 26 is also included.

Airbag 10 has deployed downwardly from the ceiling trim of vehicle 14 into passenger compartment 12 between occupant 26 and the portion of occupant enclosure 48 at rear side window 20. Fill chamber 38 supports safety cushion 40 from top edge 42 thereof and communicates thereinto through gas flow gap 36f. The panels of airbag 10, inboard panel 32 and outboard panel 50 not previously visible in FIG. 2, are secured along an exterior attachment zone at their common periphery P, thereby enclosing the interior space in which airbag 10 captures and inflates with pressurized gas G.

According to one aspect of the present invention, a curtain airbag, such as airbag 10, includes an inflatable structural member 52 that is mechanically connected to rear portion 44 of safety cushion 40. Structural member 52 is disposable upon installation in vehicle 14 for deployment into passenger compartment 12 between the deployed safety cushion 40 and occupant enclosure 48 using pressurized gas from fill chamber 38. As thusly deployed, structural member 52 serves to limit outboard displacement of rear portion 44 of the deployed safety cushion 40, reducing the risk of injury to occupant 26. Structural member 52 is fabricated from the same inboard panel 32 and outboard panel 50 as are used in forming fill chamber 38 and safety cushion 40 and in the same manner, by securement along an exterior attachment zone at their common periphery P.

An auxiliary passageway 54, also fabricated from inboard panel 32 and outboard panel 50, communicates between rear portion 44 of safety cushion 40 and structural member 52. Auxiliary passageway 54 has an entrance 56 at safety cushion 40 that receives pressurized gas directed into safety cushion 40 from fill chamber 38 and an outlet 58 at structural member 52 at which that pressurized air enters and inflates structural member 52.

When airbag 10 is installed in vehicle 14, structural member 52 in a deflated condition is folded back upon and optionally secured to safety cushion 40 in a deflated condition. As a result, a fold arises between structural member 52 and safety cushion 40. This fold traverses auxiliary passageway 54, and entrance 56 to auxiliary passageway 54 is oriented in a direction opposite from the direction of outlet 58 of auxiliary passageway 54. This tortuous gas flow pathway between safety cushion 40 and structural member 52 combines with the filling of structural member 52 indirectly from inflation chamber 38 by way of rear portion 44 of safety cushion 40, to insure that the full deployment of structural member 52 is completed after the completion of the full deployment of safety cushion 40. For example, where safety cushion 40 fully deploys within about 50 milliseconds of a side impact or a rollover involving vehicle 14, structural member 52 can be expected to fully deploy within about 150 milliseconds of that side impact or rollover. These inflation speeds meet current industry standards.

Figure 4A:
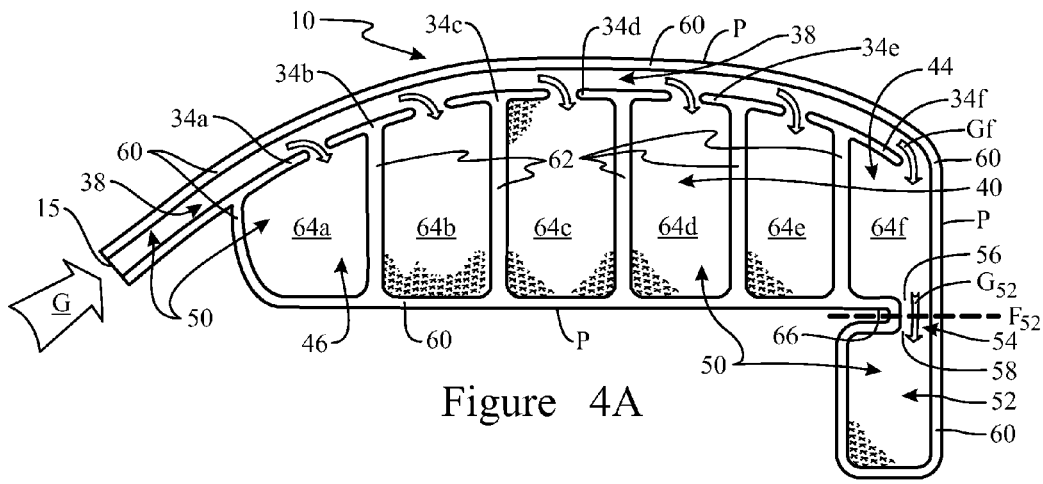
FIG. 4A is an elevation view of the curtain airbag of FIG. 2 in an unfolded condition with the inboard panel removed to depict on the outboard panel shown the attachment zones at which the outboard and the inboard panels of the curtain airbag become mutually secured.

FIG. 4A is an elevation view of airbag 10 of FIGS. 2 and 3 in an unfolded condition with inboard panel 32 removed to depict on outboard panel 50 the attachment zones at which the panels of airbag 10 become mutually secured. These attachment zones include, not only plenum boundaries 34a-34f already introduced in FIG. 2, but an exterior attachment zone 60 at periphery P and internal attachment ribs 62 that subdivide safety cushion 40 into cushion chambers 64a-64f. The portion Gf of pressurized gas G entering cushion chamber 64f at rear portion 44 of safety cushion 40 is identified, as is the fraction $G_{52}$ of portion Gf that eventually enters structural member 52 by way of auxiliary passageway 54. A fold $F_{52}$ is also shown at the lower edge 66 of rear portion 44 of safety cushion 40. When airbag 10 is to be installed in a vehicle, structural member 52 in a deflated condition is rotated downward from the plane of FIG. 4A about fold $F_{52}$ until structural member 52 rests against rear portion 44 of safety cushion 40, which is also then in a deflated condition. Auxiliary passageway 54 and structural member 52 thus communicate with rear portion 44 of safety cushion 40 at lower edge 66 thereof.

Figure 4B:
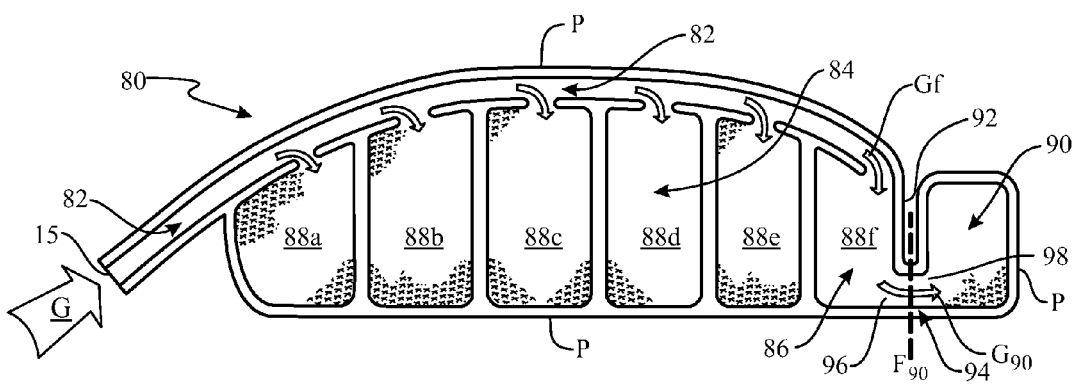
FIG. 4B is an elevation view similar to that of FIG. 4A depicting an alternate second embodiment of a curtain airbag incorporating teachings of the present invention.

FIG. 4B is an elevation view similar to that of FIG. 4A depicting an alternate second embodiment of a curtain airbag 80 incorporating teachings of the present invention. Airbag 80 includes a fill chamber 82 and a safety cushion 84 with a rear portion 86 that deploys toward the rear of passenger compartment 12 of vehicle 14 of FIG. 1. Safety cushion 84 is subdivided into cushion chambers 88a-88f by the internal attachment zones between the panels of airbag 80, which are not labeled in FIG. 4B.

To enhance the post-deployment lateral stability of safety cushion 84, airbag 80 also includes an inflatable structural member 90. Structural member 90 communicates with rear portion 86 of safety cushion 84 at a rear edge 92 thereof by way of an auxiliary passageway 94 that has an entrance 96 at cushion chamber 88f and an outlet 98 at structural member 90. The portion Gf of pressurized gas G entering cushion chamber 88f at rear portion 86 of safety cushion 84 is identified, as is the fraction $G_{90}$ of portion Ga that eventually enters structural member 90 by way of auxiliary passageway 94. A fold $F_{90}$ is also shown at rear edge 92 of rear portion 86 of safety cushion 84. When airbag 80 is to be installed in a vehicle, structural member 90 in a deflated condition is rotated from the plane of FIG. 4B about fold $F_{90}$ until structural member 90 rests against rear portion 86 of safety cushion 84, which is also in a deflated condition.

Figure 4C:
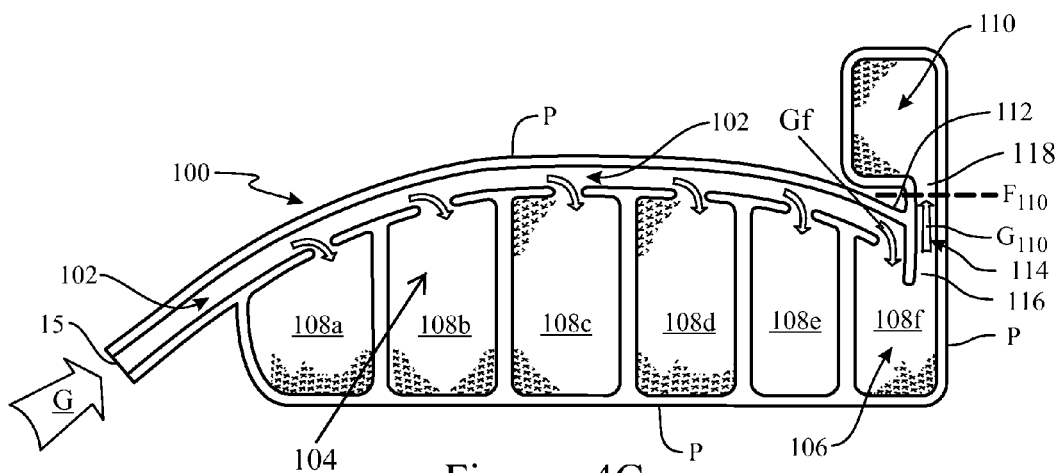
FIG. 4C is an elevation view similar to that of FIGS. 4A and 4B depicting an alternate third embodiment of a curtain airbag incorporating teachings of the present invention.

FIG. 4C is an elevation view similar to that of FIGS. 4A and 4B depicting an alternate third embodiment of a curtain airbag 100 incorporating teachings of the present invention. Airbag 100 includes a fill chamber 102 and a safety cushion 104 with a rear portion 106 that deploys toward the rear of passenger compartment 12 of vehicle 14 of FIG. 1. Safety cushion 104 is subdivided into cushion chambers 108a-108f by the internal attachment zones between the panels of airbag 100, which are not labeled in FIG. 4C.

To enhance the post-deployment lateral stability of safety cushion 104, airbag 100 also includes an inflatable structural member 110. Structural member 110 communicates with rear portion 106 of safety cushion 104 at an upper edge 112 thereof by way of an auxiliary passageway 114 that has an entrance 116 at cushion chamber 108f and an outlet 118 at structural member 110. The portion Gf of pressurized gas G entering cushion chamber 108f at rear portion 106 of safety cushion 104 is identified, as is the fraction $G_{110}$ of portion Gf that eventually enters structural member 110 by way of auxiliary passageway 114. A fold $F_{110}$ is also shown at upper edge 112 of rear portion 106 of safety cushion 104. When airbag 100 is to be installed in a vehicle, structural member 110 in a deflated condition is rotated downward from the plane of FIG. 4 about fold $F_{110}$ until structural member 110 rests against rear portion 106 of safety cushion 104, which is also in a deflated condition.

Figure 5:
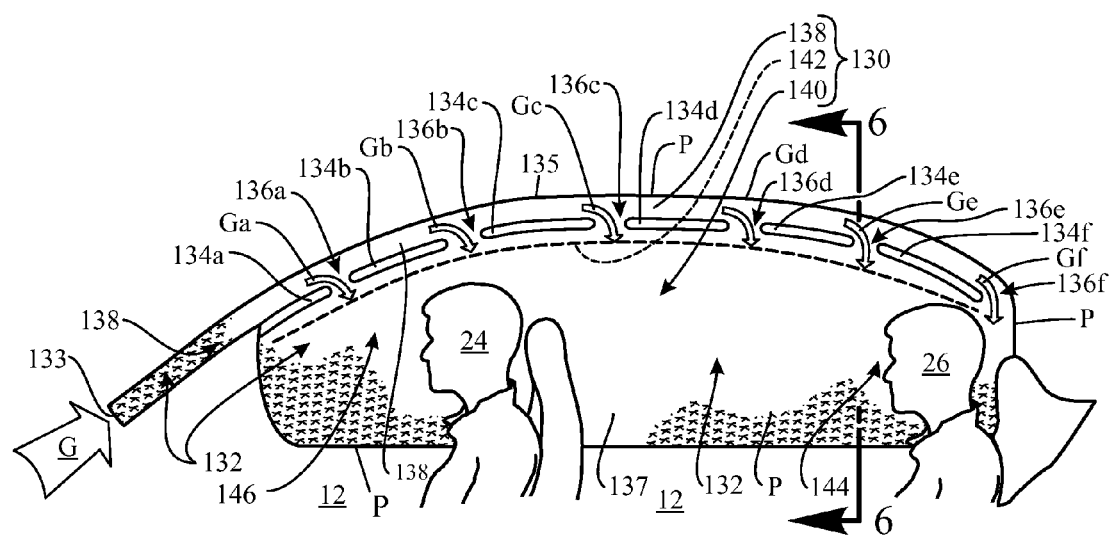
FIG. 5 is an elevation view of the passenger safety cushion and the fill chamber of an inflated fourth embodiment of a curtain airbag incorporating teachings of the present invention with the vehicle occupants of FIG. 1 in the foreground.

FIG. 5 is an elevation view of a fourth embodiment of a curtain airbag 130 incorporating teachings of the present invention with occupants 24 and 26 of vehicle 14 of FIG. 1 in the foreground. Airbag 130 is fabricated from a pair of coextensive, congruent, flexible, gas-impermeable fabric panels. These include an inboard panel 132 visible in FIG. 5, which comes to be disposed facing occupants 24 and 26 when airbag 130 is deployed, and an outboard panel that is obscured in FIG. 5 by inboard panel 132. The outboard panel of airbag 130 will, therefore, be introduced in relation to a subsequent figure. The panels of airbag 130 are disposed in alignment atop one another and secured with adhesive and/or stitching at a continuous exterior attachment zone at the common periphery P of both. Enclosed thereby between the panels is an interior space in which airbag 130 captures pressurized gas and inflates. Such pressurized gas G is shown diagrammatically in FIG. 5 as an arrow in the process of being delivered into airbag 130 through an open end 133 thereof. Open end 133 of airbag 130 is the sole portion of common periphery P of the panels of airbag 130 that, being free of any exterior attachment zone, are not secured to each other.

The fabric panels of airbag 130 are also secured to each other at selected interior attachment zones within periphery P. The interior attachment zones of airbag 130 direct the flow of pressurized gas G throughout airbag 130 appropriately and determine the shape into which airbag 130 will ultimately inflate. Of the various interior attachment zones of airbag 130, only elongated plenum boundaries 134a-134f are shown in FIG. 5.

Plenum boundaries 134a-134f are positioned in an end-to-end alignment that mirrors the shape of the top 135 of airbag 130. At the end of each of plenum boundaries 134a-134f remote from open end 133 of airbag 130 is a corresponding gas flow gap 136a-136f. Thus, for example, gas flow gap 136a is located between plenum boundaries 134a and 134b, while gas flow gap 136f, the furthest gas flow gap from open end 133 of airbag 130, is between plenum boundary 134f and periphery P of the panels of airbag 130. Pressurized gas G entering airbag 130 is initially directed away from open end 133, between plenum boundaries 134a-134f and top 135 of airbag 130. Fractional portions Ga-Gf of pressurized gas G bleed through each of gas flow gaps 136a-136f, respectively, entering and inflating the portion of airbag 130 between plenum boundaries 134a-134f and the bottom 137 of airbag 130. Thus, portion Ga of pressurized gas G enters the portion of airbag 130 between plenum boundaries 134a-134f and bottom 137 by way of gas flow gap 136a, while portion Gf enters through gas flow gap 136f.

Plenum boundaries 134a-134f accordingly separate airbag 130 into an elongated, tubular fill chamber 138 that is located between plenum boundaries 134a-134f and top 135 of airbag 130, and an inflatable passenger safety cushion 140 that is located between plenum boundaries 134a-134f and bottom 137 of airbag 130. Safety cushion 140 has a top edge 142 identified in FIG. 5 by a dashed line just below plenum boundaries 134a-134f. Fill chamber 138 is secured to top edge 142 of safety cushion 140 and accordingly supports safety cushion 140 interior of vehicle 14 for deployment into passenger compartment 12 in the manner illustrated in FIG. 1. Fill chamber 138 communicates pneumatically with safety cushion 140 at top edge 142 thereof by way of gas flow gaps 136a-136f. Thus, fill chamber 138 directs pressurized gas G into safety cushion 140 in portions Ga-Gf, which vary in quantity relative to each other according to the specific configuration of each of gas flow gaps 136a-136f.

In the deployed condition, airbag 130 is stably secured at the top 135 thereof to the occupant enclosure that surrounds vehicle compartment 12. The bottom 137 of airbag 130 is by contrast relatively less restrained, particularly in a lateral outboard-inboard direction. Contributing to this lateral instability is the separation of airbag 130 into fill chamber 138 and safety cushion 140 by plenum boundaries 134a-134f. At plenum boundaries 134a-134f, the panels of airbag 130 are secured directly to each other, and the panels of airbag 130 remain so secured, even when fill chamber 138 and safety cushion 140 are inflated. Thus, once airbag 130 has been deployed, and fill chamber 138 and safety cushion 140 are inflated, the narrowing of the panels of airbag 130 to form plenum boundaries 134a-134f causes the portion of airbag 130 traversed by plenum boundaries 134a-134f to act like a hinge between fill chamber 138 and safety cushion 140. Safety cushion 140 has a tendency to pivot relative to fill chamber 138 about plenum boundaries 134a-134f.

Safety cushion 140 has a rear portion 144 that deploys toward the rear of passenger compartment 12 in FIG. 1 and a forward portion 146 remote therefrom that correspondingly deploys toward the front of passenger compartment 12.

Figure 6:
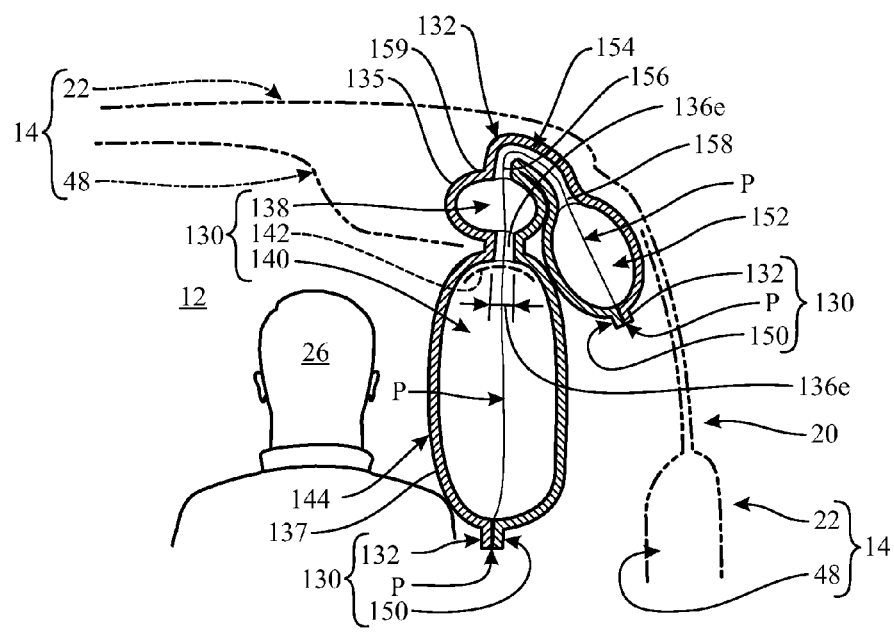
FIG. 6 is a cross section of the airbag of FIG. 5 taken along section line 6-6 therein superimposed against a profile in phantom of the occupant enclosure and the exterior of the passenger vehicle of FIG. 1.

FIG. 6 is a cross section of rear portion 144 of airbag 130 taken along section line 6-6 in FIG. 5. By way of perspective, that view of airbag 130 is superimposed against profiles in phantom of exterior 22 of vehicle 14 of FIG. 1 and of occupant enclosure 48 for passenger compartment 12. A rear view of back seat occupant 26 is also included.

Airbag 130 has deployed downwardly from the ceiling trim of vehicle 14 into passenger compartment 12 between occupant 26 and the portion of occupant enclosure 48 at rear side window 20. Fill chamber 138 supports safety cushion 140 from top edge 142 thereof and communicates thereinto through gas flow gap 136e. The panels of airbag 130, inboard panel 132 and outboard panel 150 not previously visible in FIG. 5, are secured along an exterior attachment zone at their common periphery P, thereby enclosing the interior space in which airbag 130 captures and inflates with pressurized gas G.

To enhance the post-deployment lateral stability of safety cushion 140, airbag 130 also includes an inflatable structural member 152 that is mechanically connected to safety cushion 140 by way of fill chamber 138. Structural member 152 is disposable upon installation in vehicle 14 for deployment into passenger compartment 12 along a portion of top edge 142 of safety cushion 140 corresponding to the seated position of occupant 26 in passenger compartment 12 between the deployed safety cushion 140 and occupant enclosure 48 using pressurized gas from fill chamber 138. As thusly deployed, structural member 152 serves to limit pivoting of safety cushion 140 at top edge 142 thereof, in the vicinity of plenum boundaries 134a-134f. This thwarts associated outboard displacement of safety cushion 140, reducing the risk of injury to occupant 26.

Structural member 152 is fabricated from the same inboard panel 132 and outboard panel 150 as are used in forming fill chamber 138 and safety cushion 140 and in the same manner, by securement along an exterior attachment zone at their common periphery P. An auxiliary passageway 154, also fabricated from inboard panel 132 and outboard panel 150, communicates between fill chamber 138 and structural member 152. Auxiliary passageway 154 has an entrance 156 at fill chamber 138 that receives pressurized gas therefrom and an outlet 158 at structural member 152 at which that pressurized air enters and inflates structural member 152. Entrance 156 to auxiliary passageway 154 is located at the upper edge 159 of fill chamber 138, and accordingly structural member 152 communicates with fill chamber 138 at upper edge 159 thereof.

When airbag 130 is installed in vehicle 14, structural member 152 in a deflated condition is folded back upon and optionally secured to safety cushion 140 in a deflated condition. As a result, a fold arises between structural member 152 and fill chamber 138. This fold traverses auxiliary passageway 154, and entrance 156 to auxiliary passageway 154 is oriented in a direction opposite from the direction of outlet 158 of auxiliary passageway 154. This tortuous gas flow pathway between fill chamber 138 and structural member 152 delays the full deployment of structural member 152 relative to the completion of the full deployment of safety cushion 140.

Figure 7:
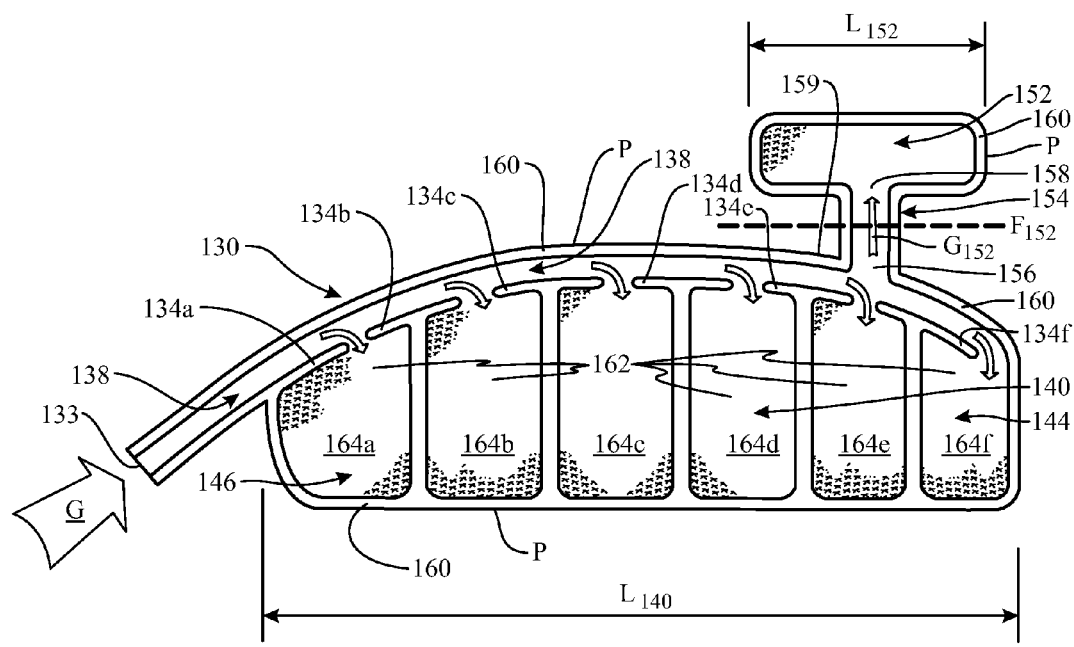
FIG. 7 is an elevation view of the curtain airbag of FIG. 5 in an unfolded condition with the inboard panel removed to depict on the outboard panel shown the attachment zones at which the outboard and the inboard panels of the curtain airbag become mutually secured.

FIG. 7 is an elevation view of airbag 130 of FIGS. 5 and 6 in an unfolded condition with inboard panel 132 removed to depict on outboard panel 150 the attachment zones at which the panels of airbag 130 become mutually secured. These attachment zones include, not only plenum boundaries 134a-134f already introduced in FIG. 5, but an exterior attachment zone 160 at periphery P and internal attachment ribs 162 that subdivide safety cushion 140 into cushion chambers 164a-164f.

To enhance protection for a specific single occupant, such as occupant 26, the length $L_{152}$ of structural member 152 may be made less than the length $L_{140}$ of safety cushion 140. Portion $G_{152}$ of pressurized gas G enters structural member 152 by way of auxiliary passageway 154. A fold $F_{152}$ is shown at the upper edge 159 of fill chamber 138. When airbag 130 is to be installed in a vehicle, structural member 152 in a deflated condition is rotated downward from the plane of FIG. 7 about fold $F_{152}$ until structural member 152 rests against top edge 142 of safety cushion 140, which is also then in a deflated condition.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A post-deployment position-stabilized curtain airbag for installation in a vehicle to protect an occupant in case of side impact or rollover, the airbag comprising:
    (a) an inflatable passenger safety cushion supportable at a top edge thereof interior of the vehicle for deployment into the passenger compartment of the vehicle between the occupant and the occupant enclosure;
    (b) a fill chamber secured to the top edge of the safety cushion in fluid communication therewith, the fill chamber directing pressurized gas from an inflator into the safety cushion to effect deployment thereof; and
    (c) an inflatable structural member having closed peripheral sides and being mechanically connected to the safety cushion by an auxiliary passageway disposed between the structural member and the safety cushion such that the closed peripheral sides are separate from the safety cushion, the structural member being disposable upon installation in the vehicle for deployment into the passenger compartment between the deployed safety cushion and the occupant enclosure using pressurized gas directed through the fill chamber and the auxiliary passageway, the deployed structural member serving to limit outboard displacement of the deployed safety cushion, wherein the structural member deploys along the top edge of the safety cushion, and the deployed structural member serves to limit pivoting of the deployed safety cushion at the top edge thereof relative to the fill chamber.

2. A post-deployment position-stabilized curtain airbag for installation in a vehicle to protect an occupant in case of side impact or rollover, the airbag comprising:
    (a) an inflatable passenger safety cushion supportable at a top edge thereof interior of the vehicle for deployment into the passenger compartment of the vehicle between the occupant and the occupant enclosure, the safety cushion having a rear portion deploying toward the rear of the passenger compartment and a forward portion remote therefrom;
    (b) a fill chamber secured to the top edge of the safety cushion in fluid communication therewith, the fill chamber directing pressurized gas from an inflator into the safety cushion to effect deployment thereof;
    (c) an inflatable structural member mechanically connected to the rear portion of the safety cushion, the structural member being disposable upon installation in the vehicle for deployment into the passenger compartment between the deployed safety cushion and the occupant enclosure using pressurized gas directed from the fill chamber through the safety cushion, the deployed structural member serving to limit outboard displacement of the rear portion of the deployed safety cushion, wherein the full deployment of the structural member is completed after the completion of the full deployment of the safety cushion; and
    (d) an auxiliary passageway communicating between the rear portion of the safety cushion and the structural member, and pressurized gas from the safety cushion enters the structural member through the auxiliary passageway, wherein the auxiliary passageway communicates with the safety cushion at a lower edge of the rear portion of the safety cushion.

3. A curtain airbag as recited in claim 2, wherein the structural member is folded against the safety cushion along a transverse axis of the auxiliary passageway prior to deployment.

4. A post-deployment position-stabilized curtain airbag for installation in a vehicle to protect an occupant in case of side impact or rollover, the airbag comprising:
    (a) an inflatable passenger safety cushion supportable at a top edge thereof interior of the vehicle for deployment into the passenger compartment of the vehicle between the occupant and the occupant enclosure;
    (b) a fill chamber secured to and communicating with the safety cushion at the top edge thereof, the fill chamber directing pressurized gas from an inflator into the safety cushion to effect the deployment thereof; and (c) an inflatable structural member having closed peripheral sides and being mechanically connected to the safety cushion by an auxiliary passageway disposed between the structural member and the safety cushion such that the closed peripheral sides are separate from the safety cushion, the structural member being disposable upon installation in the vehicle for deployment into the passenger compartment along the top edge of the safety cushion between the deployed safety cushion and the occupant enclosure using pressurized gas directed through the fill chamber and the auxiliary passageway, the deployed structural member serving to limit pivoting of the deployed safety cushion at the top edge thereof relative to the fill chamber.

5. A curtain airbag as recited in claim 4, wherein pressurized gas enters the structural member directly from the fill chamber.

6. A curtain airbag as recited in claim 4, wherein the structural member is folded against the safety cushion along a transverse axis of the auxiliary passageway prior to deployment.

7. A curtain airbag as recited in claim 4, wherein the length of the structural member is less than the length of the safety cushion.

8. A curtain airbag as recited in claim 7, wherein the structural member deploys along a portion of the top edge of the safety cushion corresponding to the seated position of the occupant in the passenger compartment.

* * * * *